No. 816,623. PATENTED APR. 3, 1906.
B. G. VAUGHAN.
MATCH MAKING MACHINERY.
APPLICATION FILED AUG. 4, 1904.

3 SHEETS—SHEET 1.

Witnesses:
Edw. R. Barrett
J. A. Hill

Inventor
Bernard G. Vaughan.
By John H. Garnsey, Atty.

No. 816,623. PATENTED APR. 3, 1906.
B. G. VAUGHAN.
MATCH MAKING MACHINERY.
APPLICATION FILED AUG. 4, 1904.
3 SHEETS—SHEET 2.
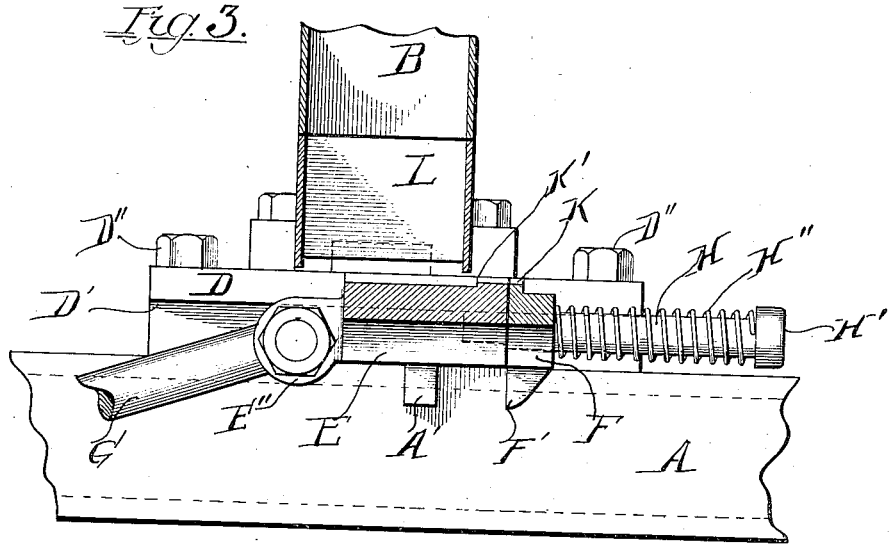
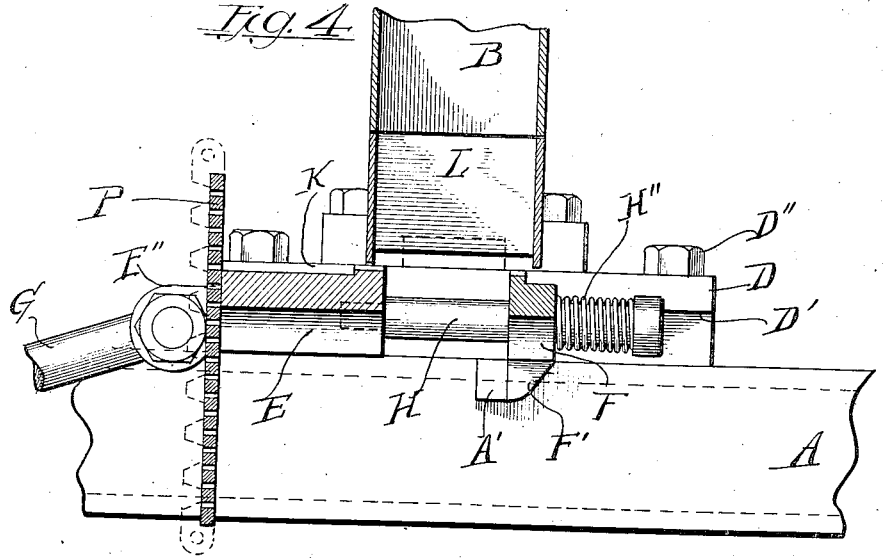

No. 816,623. PATENTED APR. 3, 1906.
B. G. VAUGHAN.
MATCH MAKING MACHINERY.
APPLICATION FILED AUG. 4, 1904.
3 SHEETS—SHEET 3.
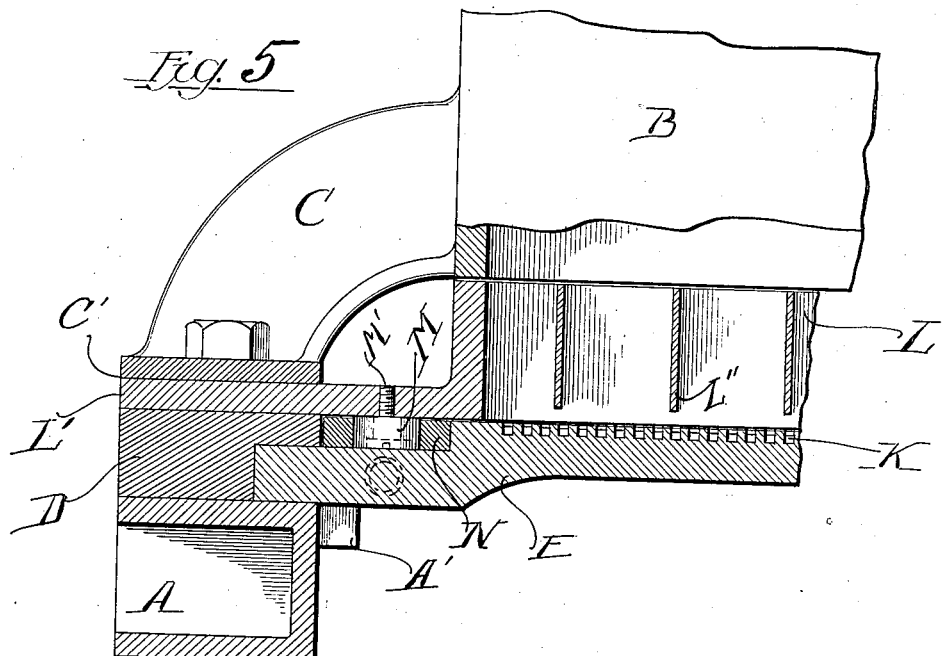
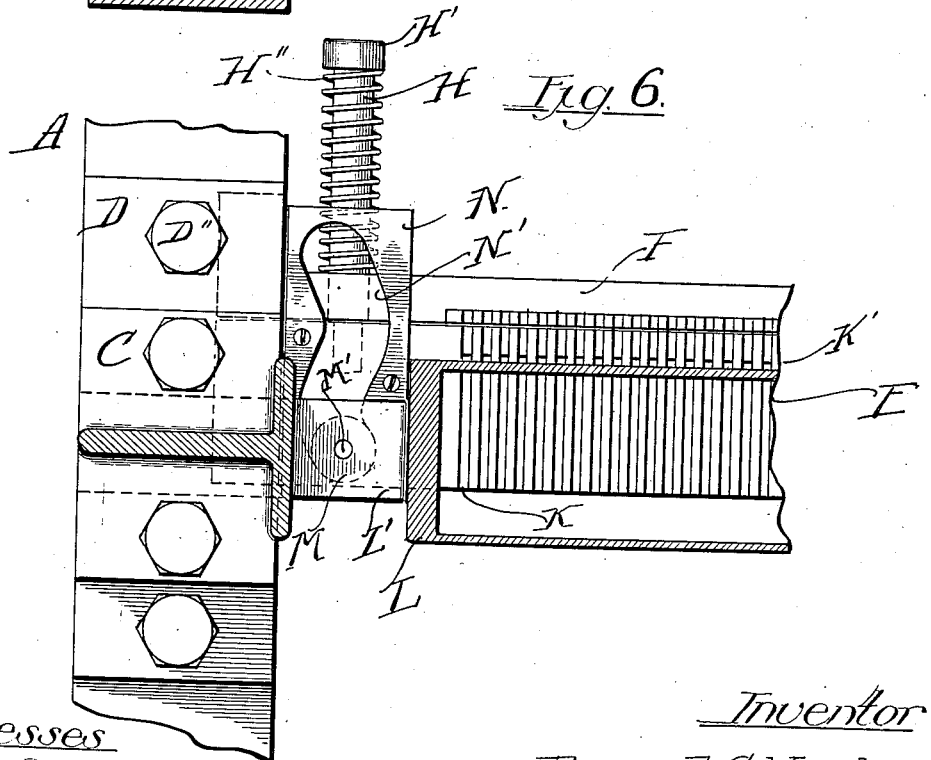
Witnesses
Edw. L. Barrett
J. A. Hice
Inventor
Bernard G. Vaughan
By John H. Garnsey, Atty

UNITED STATES PATENT OFFICE.

BERNARD G. VAUGHAN, OF JOLIET, ILLINOIS, ASSIGNOR OF ONE-THIRD TO FRED BENNITT AND ONE-THIRD TO LOUIS A. SHERWOOD, BOTH OF JOLIET, ILLINOIS.

MATCH-MAKING MACHINERY.

No. 816,623.     Specification of Letters Patent.     Patented April 3, 1906.

Application filed August 4, 1904. Serial No. 219,562.

*To all whom it may concern:*

Be it known that I, BERNARD G. VAUGHAN, a citizen of the United States, residing at Joliet, Will county, Illinois, have invented a new and useful Improvement in Match-Making Machinery, of which the following is a specification.

My invention relates to match-making machinery, and especially to that branch of the art comprising the setting devices for placing the match-sticks in the plates or carriers preparatory to the process of dipping. It also includes the hopper feed mechanism, whereby the sticks are fed to the setting-head, both mechanisms being actuated by the same devices and in my invention parts of each being essential parts of the other, all going to make up the process of setting.

The objects of my invention are to provide a satisfactory means of discharging the broken pieces and short sticks during the actual movement of the machine; to secure a practically continuous movement of the setting-head, the only stop being the substantially instantaneous one at the instant of reversing the motion, thus enabling the machine to be satisfactorily run at a high rate of speed; to provide a follower for the setting-head which shall materially aid in the filling of the setting-head and in the discharge of broken sticks; to provide a setting-head into which the sticks are filled and from which they are directly set and which shall be the actuating power for the agitating-hopper, and to reduce the number of parts, thus providing a machine of great simplicity and high efficiency. I attain these objects by the use of the mechanism shown in the accompanying drawings, which are hereby made a part of the specification, and in which—

Figure 1:
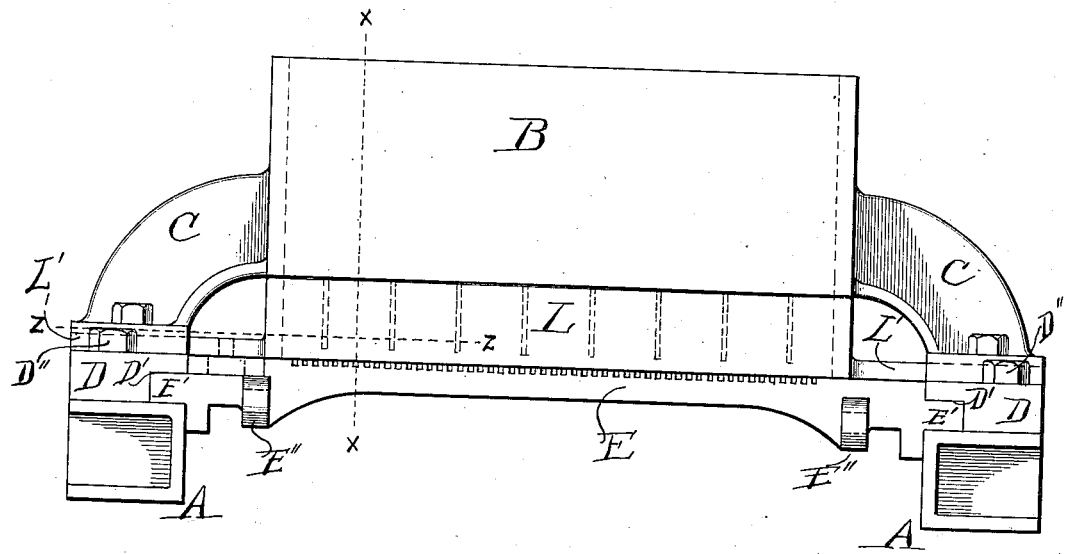
Figure 2:
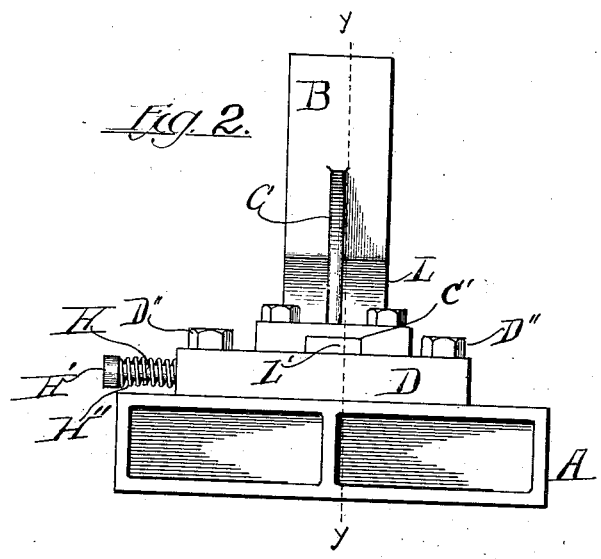

Figure 1 is a front elevation of my invention. Fig. 2 is an end elevation. Fig. 3 is a view, partly in section on the line *x x* of Fig. 1, showing the filling position. Fig. 4 is the same, showing the setting position. Fig. 5 is a section on the line *y y* of Fig. 2, and Fig. 6 is a top view of the head and agitation mechanism, partly in section, on the line *z z* of Fig. 1.

In the drawings like letters indicate like parts.

The bed-frame of the machine A may be the usual cast frame used on machines of this type, supported in any manner by legs or braces. Upon this is a loading-hopper B, which is stationary and supported by brackets C above the frame A. On either side of the frame A is a slide-plate D, bolted or secured to the frame by suitable means, such as the bolts D''. This slide-plate may be provided with a groove D' on its inner face, forming with the top of the frame A a slide for the head E and its follower F. This slide-bearing may be of any convenient shape, that shown in the drawings being most convenient and simple.

On the head E is a lug E'', to which is attached the actuating mechanism for the head and follower, indicated in the drawings by the pitman G. Any suitable means may be used, however, for producing the motion of the head. In the rear end of the head E is secured one or more rods H, which pass freely through the follower F and terminate in a boss H'. I prefer to have one of these rods at each end of the head; but it may be necessary to have one in the middle, and it may be practicable to operate the head with one. The rod H is encircled by a spiral spring H'', which is always compressed in any position of the head or follower between the follower F and the boss H'. The follower F is of the same length as the head E and slides in the plate D. In the surface of the head E and the follower F are grooves K, continuous across the entire top of both head and follower. The follower is adapted to fit closely to the head when in contact therewith, so that the grooves K are smooth and continuous. These grooves are preferably square, as my machine is best adapted for square sticks, and in the follower and up to the line K' in the head these grooves are less than the thickness of a match-stick in depth, preferably one-half the thickness thereof. In front of the line K' the grooves are more than the thickness of a match-stick in depth, preferably one and one-half times thereof, so that a stick lying in this part of the grooves will be entirely below the bottom of the shallower parts. On the follower F is a lug F', which is adapted to contact with a stop A', which may be conveniently a part of the frame A. The follower, as shown in the drawings, is approximately one-third of the width of the head, the top portion being approximately one-third of the width of the body; but these dimensions are not arbitrary and may be varied.

The deep grooves K in the head E are less in length than a match-stick, so that when a stick lies in them it will project from the front of the head. The loading-hopper B is, as I have shown, stationary; but the filling-hopper L, which fits closely below it, is movable in a direction across and at right angles to the motion of the head E. It is held in position by guides L', which pass through slots C' in the bases of the brackets C. These guides L' also serve to support the hopper L. Both loading and filling hoppers are exactly the length of a match-stick in width and extend slightly beyond the grooves K at either end. The filling-hopper L is provided with partitions L'' to prevent massing of the sticks and also to prevent their being turned in the agitating motion. These partitions may stop short of the bottom level of the hopper in order to prevent the sticks being caught between the partitions and the head and clogging the machinery.

On one of the guides L' is placed the agitating connection between the hopper and the head. This may be at both ends; but I believe that it will operate satisfactorily from one end. This mechanism consists of the roller M, attached to the lower side of the slide L' by a bolt or screw M'. The portion of the head E coming under this slide is cut out to admit of the attachment thereto of a plate N, having therein a curved slot N'. This slot could be constructed in the head itself by a slightly-different arrangement of parts; but I prefer to attach the plate as shown, as it secures a lighter adjustment. The curved slot N' is just the width of the roller M, which rests therein, the guide L' fitting closely to the top of the plate N. The length of the axis of the slot N' is equal to the stroke of the head E when in operation, and the filling-hopper L slides just free of the surfaces of the head and follower.

The operation of my device is as follows: The loading-hopper B is filled with match-sticks, being just large enough in width, as I have said, to accommodate one row of sticks. The sticks of course fill up the filling-hopper L between its partitions at the same time and sinking evenly down. The head and follower being in the position shown in Fig. 3 fill the deep grooves K in the head and project over the front of the head. The head being then sent forward into the position shown in Fig. 4, the sticks in the deep grooves slide out from under the ones on top of them, which are caught by the shallow grooves in the head and in the follower. The sticks in the deep grooves are presented to the perforated plate (shown in Fig. 4 at P) and are set therein. The follower F moves forward with the head, impelled by the spring H'', until the lug F' thereon strikes the stop A', when the head going on, carrying one end of the good sticks, the follower continues to support the other end, allowing the short and broken sticks to drop down and out through the space between the head and follower. (Shown in Fig. 4.) When the match-sticks in the deep grooves are set, the head returns, the follower remaining in position until caught by the head and forced back, when the sticks which have been supported by the head and follower slide into the deep grooves and the action is repeated. It is needless to say that this simple motion is performed with great rapidity. Theoretically this operation can be performed just as above described; but in practice it cannot. The pressure of the match-sticks in the hoppers would fill the grooves were it not for the friction of the sticks, which causes them to stick and clog. It is necessary, therefore, in order to have the setting and filling device complete to shake the sticks down constantly. This is accomplished by means of the slot N' and the roller M, the latter accommodating itself to the motion of the plate N below it, the plate N moving forward and back in a line parallel with the line of motion of the head E, to which it is attached, while the roller M in the slot N' is forced to follow the sinuosities of the slot, and being attached to the hopper L by the pivot M' the hopper L is kept in constant agitation in a direction at right angles with the motion of the head E. This agitation effectually shakes out the broken pieces when the head and follower are separated. I am aware that in other machines this cross-agitation is produced by other means, usually a cylinder-cam on the outside of the frame; but in my invention the motion is accomplished with less friction and less power.

By having the sticks set into the plate by the head which first receives them I avoid all danger of splitting sticks by transference from a filler to a setter, and I also give a more ample space for the disposal of broken sticks.

As modifications of my invention may suggest themselves to one skilled in the art, I do not confine myself to the exact construction set forth in this specification; but—

What I claim, and desire to secure Letters Patent for, is the following:

1. In a machine of the class described, in combination, a bed-frame, a setting-head slidably mounted in said frame and having grooves on its upper surface, said grooves being of greater depth at one end than at the other, and a follower slidably mounted in said frame having on its upper surface grooves continuous with the shallow portion of the grooves in said head and of the same depth as said shallow grooves, substantially as described.

2. In a machine of the class described, in combination, a bed-frame, a loading-hopper mounted above said frame, a filling-hopper immediately beneath said loading-hopper and loadable therefrom and adapted to move across said frame, a splint-setting head adapted to move forward and back in said frame, said head being immediately below said filling-hopper and fillable therefrom, and a pivoted roller M upon said filling-hopper engaging with a curved slot on said head, substantially as described.

3. In a machine of the class described, in combination, a frame, a filling-hopper slidably mounted on said frame, a grooved splint-setting head slidably mounted on said frame and below said hopper, means for moving said head, and an actuating connection between said head and said hopper comprising a curved slot on said head engaging with a pivot on said hopper, said actuating connection being unconnected with said frame, substantially as described.

4. In a machine of the class described, in combination, a frame, a loading-hopper thereon, a filling-hopper slidable on said frame and forming a continuation of said loading-hopper, a splint-setting head having grooves on its upper surface, adapted to reciprocate on said frame and adapted to be filled by said filling-hopper, actuating means for said head, and a pivotal actuating connection between said head and said filling-hopper comprising a curved slot on said head engaging with a pivot on said hopper substantially as described.

In witness whereof I have signed my name to this specification in the presence of two subscribing witnesses.

BERNARD G. VAUGHAN.

Witnesses:
   L. A. SHERWOOD,
   JOHN H. GARNSEY.